May 1, 1962     B. B. WOERTZ ETAL     3,032,101
IMPROVED WATERFLOODING PROCESS
Filed April 10, 1958
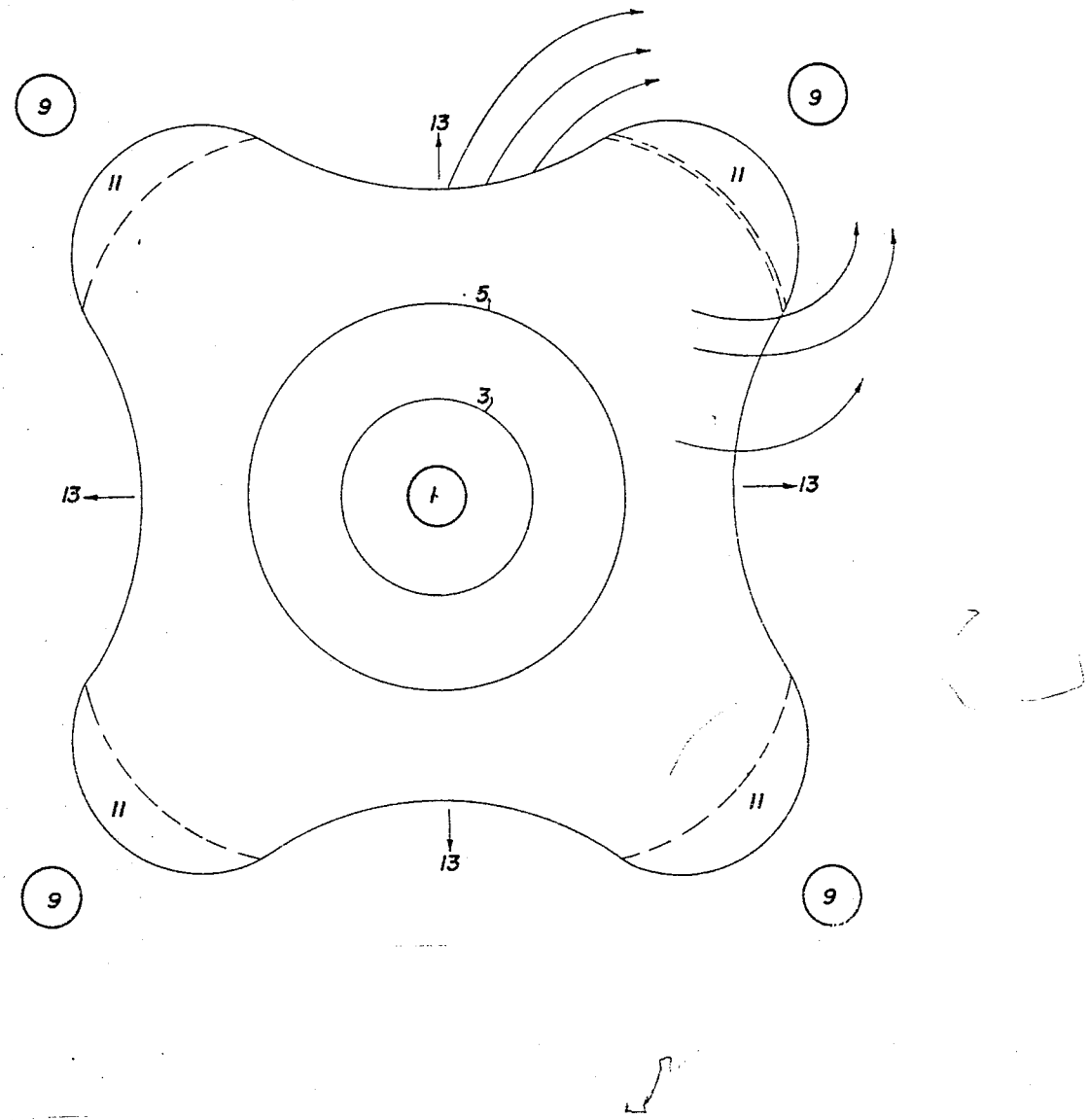
INVENTORS.
BYRON B. WOERTZ
BY LEROY W. HOLM
ATTORNEY

United States Patent Office 3,032,101
Patented May 1, 1962

3,032,101
IMPROVED WATERFLOODING PROCESS
Byron B. Woertz and Leroy W. Holm, Crystal Lake, Ill., assignors to The Pure Oil Company, Chicago, Ill., a corporation of Ohio
Filed Apr. 10, 1958, Ser. No. 727,653
2 Claims. (Cl. 166—9)

This invention relates to a method for recovering oil from subterranean petroleum reservoirs, and is more particularly concerned with a method of secondary flooding for recovering residual oil which is tightly held in the producing formation.

In the conventional water-flooding of petroleum reservoirs for secondary recovery of oil remaining in place, it is common practice to inject water into one or more injection wells and produce the oil from other wells spaced about the producing formation in a selected pattern. Water injection is continued until break-through occurs at the producing wells and is continued even after water break-through, until the water-oil ratio of the produced fluid increases to a value which makes further production uneconomical. At this point there are significant quantities of oil still remaining in pockets between the producing wells which have not been flooded by the injection water.

In accordance with our invention, a producing formation, which may or may not have been previously water-flooded, is treated by shutting in the production wells, injecting water through one or more injection wells drilled in the formation until formation pressure is raised to about 1500–3000 lb./sq. in., then injecting carbon dioxide or other gas at high pressure while maintaining the pressure in the producing formation, resuming oil production and continuing gas injection until break-through occurs at the producing wells, and then allowing the formation pressure to drop rapidly about 100–500 lbs./sq. in. in the region of the producing wells by increasing the rate of production. By following this technique, rapid vaporization of the carbon dioxide dissolved in the oil in the regions of the producing wells occurs, with resulting increase in the viscosity of the oil and precipitation of asphaltic constiuents. This precipitation clogs the formation adjacent to the producing wells, thereby forcing the water flood into those areas between the producing wells which have previously not been reached.

It is an object of this invention to provide an improved method for recovering residual oils in natural underground petroleum reservoirs. It is another object of this invention to provide a method for increasing the recovery of oil from natural, subterranean, producing formations. It is a further object of this invention to provide a method for increasing the area reached by water-flooding underground producing formations without the necessity of having to drill a large number of producing wells. Further objects of the invention will appear from the following description and accompanying drawing, of which the FIGURE is a graphical illustration of the manner in which the invention operates.

Although the invention is applicable to treatment of producing formations either before or after conventional water-flooding, gas-drive, or combination thereof, it will be described in conjunction with treatment of a producing formation which has been previously water-flooded to its economical limit. The producing wells drilled into the formation are shut in and water, either fresh or brine, is injected until the formation pressure reaches about 1500–3000 lb./sq. in. Gas is then injected at a pressure sufficient to overcome the formation pressure and the producing wells are put on production at a rate such as to maintain the bottom hole or formation pressure at approximately the pressure attained during the injection of water. Although we prefer to use carbon dioxide or gas rich in carbon dioxide, as for example, gas produced by burning natural gas in the presence of air, partially or wholly denuded of nitrogen, other gases, such as methane, ethane, propane, butane, or mixtures thereof may be used. We prefer carbon dioxide because of its low critical temperature, and moderate solubility in hydrocarbons.

When break-through of the injected gas occurs at the producing wells, the production rate is increased sufficiently to obtain a rapid drop in bottom-hole or formation pressure of about 100–500 lb./sq. in. Gas injection is continued during this operation. The pressure drop may take place over a period of approximately 1–30 days. As a result of the drop in pressure, carbon dioxide or other gas is released from solution in the oil bank adjacent to the producing wells, resulting in increased viscosity of the oil and, to some extent, precipitation of asphalt contained in the oil. The viscous oil and asphalt become lodged in the pores and channels of smallest cross-sectional area, causing at least partial plugging thereof. While this plugging tends to occur throughout the entire extent of the zone of lower pressure, it is most pronounced in those areas adjacent to the producing wells. The manner in which this occurs is illustrated in the accompanying drawing, in which the numeral 1 indicates an injection well through which water and carbon dioxide have been injected. The boundary lines 3 and 5 indicate the boundaries of the advancing flood-front at different stages in its advance toward the producing wells 9. Upon sudden reduction of the formation pressure and evaporation of carbon dioxide from the advancing oil front, the areas which are most affected are the areas marked 11 contiguous to the producing wells. Partial plugging of these areas occurs by the more viscous oil and precipitated asphalt, thereby forcing the flood-front to move out in the directions marked 13, and displace oil from these areas of the formation.

It may be desirable after the desired reduction in pressure has been achieved to again build up bottom-hole pressure to the level originally attained by completely or partially shutting in the production wells, and after the pressure has been regained, production can be resumed at a level to maintain the formation pressure substantially constant until the ratio of water to oil produced becomes uneconomical.

The process can be repeated one or more times, until it is determined that no improvement in the water/oil ratio is obtained. Thus, after the uneconomical water/oil ratio of 40/1 or greater is reached, pressure can again be suddenly reduced to bring about further precipitation of asphalt in the formation, after which pressure is again built up to the desired level and production resumed with continued gas injection.

As a specific example of the invention, an oil reservoir which has been previously water-flooded until the water/oil production ratio was 50/1, in which 50% of the oil originally in place is still retained in the producing formation and in which the bottom-hole pressure has dropped to approximately 500 lb./sq. in., is injected with fresh water until the bottom-hole pressure reaches 1500 lb./sq. in. Carbon dioxide, prepared by burning natural gas with air and then denuding the resulting combustion products of nitrogen, is injected into the formation through an injection well at a pressure of approximately 1550 lb./sq. in. Production is resumed during the carbon dioxide injection at a rate sufficient to maintain the bottom-hole pressure at approximately 1500 lb./sq. in. When the ratio of water to oil being produced reaches about 40 to 1, the rate of production is increased sufficiently to cause a bottom-hole pressure drop of 300 lb./sq. in. within a period of 100 days, after which the production wells are shut in until the formation pressure is again built up to approximately 1500 lb./sq. in. by carbon dioxide injection, whereupon production is resumed and the water-to-oil ratio is found to be about 1 to 1.

It will be seen, therefore, that by means of our invention it is possible to recover a larger portion of the residual oil in subterranean formations under conditions which are considered to be economically justifiable.

We claim as our invention:

1. A process for recovering oil from a partially depleted water-flooded subterranean formation which comprises shutting in the producing wells drilled into the formation, injecting water through separate injection wells into said formation until a formation pressure of 1500–3000 p.s.i. is attained, then injecting an oil-soluble gas through said injection wells and into the formation and simultaneously therewith opening said producing wells, producing fluid from said producing wells at a rate to maintain said formation at the pressure attained during water injection by holding back pressure on said producing wells, continuing injection of said gas after breakthrough of said gas occurs at a producing well, while releasing back pressure on said producing well to increase the rate of fluid production therefrom and to cause a sudden decrease of formation pressure in the region of said producing well in the amount of 100 to 500 p.s.i. over a period of 1 to 30 days and continuing to produce fluids from said producing wells.

2. A method in accordance with claim 1 in which said oil-soluble gas is carbon dioxide.

References Cited in the file of this patent

UNITED STATES PATENTS

| | | |
|---|---|---|
| 1,067,868 | Dunn | July 22, 1913 |
| 1,658,305 | Russell | Feb. 7, 1928 |
| 2,048,731 | Doherty | July 28, 1936 |
| 2,272,673 | Kennedy | Feb. 10, 1942 |
| 2,623,596 | Whorton et al. | Dec. 30, 1952 |
| 2,875,831 | Martin et al. | Mar. 3, 1959 |
| 2,875,832 | Martin et al. | Mar. 3, 1959 |
| 2,875,833 | Martin | Mar. 3, 1959 |